United States Patent
Yablonsky et al.

(10) Patent No.: US 10,052,584 B2
(45) Date of Patent: Aug. 21, 2018

(54) WATER RECYCLING IN A $CO_2$ REMOVAL PROCESS AND SYSTEM

(71) Applicant: Skyonic Corporation, Austin, TX (US)

(72) Inventors: Al Yablonsky, Austin, TX (US); Adam Germain, Austin, TX (US); Alexander Stola, Austin, TX (US)

(73) Assignee: CARBONFREE CHEMICAL HOLDINGS, LLC, White Plains, NY (US)

( * ) Notice: Subject to any disclaimer, the term of this patent is extended or adjusted under 35 U.S.C. 154(b) by 304 days.

(21) Appl. No.: 14/918,409

(22) Filed: Oct. 20, 2015

(65) Prior Publication Data

US 2016/0107118 A1    Apr. 21, 2016

Related U.S. Application Data

(60) Provisional application No. 62/066,688, filed on Oct. 21, 2014.

(51) Int. Cl.
*B01D 53/52* (2006.01)
*B01D 53/62* (2006.01)
(Continued)

(52) U.S. Cl.
CPC ........... *B01D 53/62* (2013.01); *B01D 53/965* (2013.01); *C10L 3/104* (2013.01); *C25B 1/34* (2013.01); *C25B 9/00* (2013.01); *B01D 53/68* (2013.01); *B01D 53/78* (2013.01); *B01D 2251/304* (2013.01); *B01D 2251/604* (2013.01); *B01D 2256/24* (2013.01); *B01D 2257/108* (2013.01); *B01D 2257/2045* (2013.01); *B01D 2257/302* (2013.01); *B01D 2257/304* (2013.01); *B01D 2257/404* (2013.01); *B01D 2257/504* (2013.01); *B01D 2257/60* (2013.01); *B01D 2258/0283* (2013.01); *C10L 2290/08* (2013.01); *C10L 2290/541* (2013.01); *Y02C 10/04* (2013.01); *Y02C 10/06* (2013.01); *Y02P 20/152* (2015.11)

(58) Field of Classification Search
None
See application file for complete search history.

(56) References Cited

U.S. PATENT DOCUMENTS

| 4,720,375 A | 1/1988 | Ainscow et al. ............. 423/175 |
| 7,655,193 B1 | 2/2010 | Rau et al. ..................... 422/169 |

(Continued)

FOREIGN PATENT DOCUMENTS

| WO | WO 2009/039445 | 3/2009 |
| WO | WO 2011/075680 | 6/2011 |
| WO | WO 2012/006601 | 1/2012 |

OTHER PUBLICATIONS

Goldberg, P., et al., "CO2 Mineral Sequestration Studies" in US. Proceedings of the First National Conference on Carbon Sequestration, May 14-17, 2001, Washington, DC, session 6C.

(Continued)

*Primary Examiner* — Anita Nassiri Motlagh
(74) *Attorney, Agent, or Firm* — Norton Rose Fulbright US LLP (57) ABSTRACT

Apparatuses, systems, and methods related to removing carbon dioxide from a gas stream are provided. Gas streams can be waste gas streams or natural gas streams. The systems and methods for removing carbon dioxide incorporate water repurposing schemes. Still others are disclosed.

13 Claims, 3 Drawing Sheets

(51) Int. Cl.
*C10L 3/10* (2006.01)
*C25B 1/34* (2006.01)
*C25B 9/00* (2006.01)
*B01D 53/96* (2006.01)
*B01D 53/78* (2006.01)
*B01D 53/68* (2006.01)

(56) References Cited

U.S. PATENT DOCUMENTS

| | | |
|---|---|---|
| 7,727,374 B2 | 6/2010 | Jones et al. ............... 205/508 |
| 7,749,476 B2 | 7/2010 | Constantz et al. ......... 423/430 |
| 7,754,169 B2 | 7/2010 | Constantz et al. ......... 423/165 |
| 7,842,126 B1 | 11/2010 | Dilmore et al. ............... 95/195 |
| 7,914,685 B2 | 3/2011 | Constantz et al. ......... 210/702 |
| 7,947,239 B2 | 5/2011 | Lackner et al. ............ 423/220 |
| 8,062,418 B2 | 11/2011 | Constantz et al. ......... 106/738 |
| 8,105,558 B2 | 1/2012 | Comrie ........................ 423/210 |
| 8,114,374 B2 | 2/2012 | Blencoe et al. ............ 423/432 |
| 8,137,444 B2 | 3/2012 | Farsad et al. ................. 96/235 |
| 8,202,659 B2 | 6/2012 | Coustry et al. ............. 429/421 |
| 8,470,281 B2 | 6/2013 | Bang et al. ................. 423/431 |
| 8,617,500 B2 | 12/2013 | Gartner et al. ............. 423/230 |
| 8,673,256 B2 | 3/2014 | Blencoe et al. .......... 423/419.1 |
| 8,883,104 B2 | 11/2014 | Seeker et al. .............. 423/220 |
| 9,205,375 B2 | 12/2015 | Jones et al. |
| 9,339,761 B2 | 5/2016 | Jones et al. |
| 2006/0185985 A1 | 8/2006 | Jones ........................... 205/508 |
| 2009/0127127 A1 | 5/2009 | Jones ........................... 205/464 |
| 2009/0169452 A1 | 7/2009 | Constantz et al. ......... 423/230 |
| 2010/0051859 A1 | 3/2010 | House et al. ............ 252/182.32 |
| 2010/0084283 A1 | 4/2010 | Gomez et al. ............... 205/742 |
| 2011/0036728 A1 | 2/2011 | Farsad ......................... 205/770 |
| 2011/0091366 A1 | 4/2011 | Kendall et al. ............. 423/220 |
| 2011/0135551 A1 | 6/2011 | House et al. ............... 423/234 |
| 2011/0203939 A1 | 8/2011 | Jones et al. ................. 205/480 |
| 2012/0034144 A1 | 2/2012 | Jones et al. ................. 423/220 |
| 2013/0192783 A1 | 8/2013 | Devenney et al. ........ 162/181.2 |
| 2013/0202516 A1 | 8/2013 | Jones et al. ................. 423/431 |
| 2014/0147371 A1 | 5/2014 | Blencoe et al. ............ 423/432 |

OTHER PUBLICATIONS

Haywood, H. et al., Carbon Dioxide Sequestration as Stable Carbonate Minerals—Environmental Barriers, Environmental Geology, Springer Berlin, Heidelberg, Aug. 21, 2001.

International Search Report and Written Opinion issued in PCT/US2015/056519, dated Jan. 11, 2016.

Mazotti, M., et al., "Mineral Carbonation and Industrial Uses of Carbon Dioxide," Chapter 7 of Report Edited by Metz, B., et al., 2005, Intergovernmental Panel on Climate Change (online URL) http://www.ipcc.ch/pdf/special-reports/srccs/srccs_chapter7.pdf. p. 325. May 31, 2012.

S. Eloneva, "Reducation of CO2 Emissions by Mineral Carbonation: Steelmaking Slags as Raw Material with a Pure Calcium Carbonate End Product," PhD Thesis, Aalto University School of Science and Technology, Espoo Finland, (online URL) http://lib.tkk.fi/Diss/2010/isbn978952603577/isbn978526034577.pdf. pp. 31-33 (2010).

Spycher, N. et al., "CO2-H2O Mixtures in the Goeological Sequestrian of CO2. II. Partitioning in Chloride Brines at 12-100C and up to 600 bar," Lawrence Berkeley National Laboratory (online URL) http://escholarship.org/nc/item/2z23y4zc. Sep. 13, 2004.

WATER RECYCLING IN A CO₂ REMOVAL PROCESS AND SYSTEM

CROSS REFERENCE TO RELATED APPLICATIONS

This application claims the benefit of priority to U.S. Provisional Patent Application Ser. No. 62/066,688, filed Oct. 21, 2014, hereby incorporated by reference in its entirety.

BACKGROUND

A. Field of the Invention

The present invention generally relates to the field of removing pollutants from a gas stream. More particularly, the present invention relates to removing $CO_2$ from gas streams and converting it to bicarbonate.

B. Description of Related Art

Most of the energy used in the world today is derived from the combustion of carbon and hydrogen containing fuels such as coal, oil, and natural gas. Through the combustion of these fuels, $CO_2$ is released. Awareness to the damaging effects of $CO_2$ released during combustion has led to the enforcement of limits on $CO_2$ emissions from power plants, refineries, and other industrial processes, which are expected to become more stringent overtime. Thus, pressures by regulators and the marketplace are increasing to reduce $CO_2$ emissions.

In order reduce $CO_2$ emissions, chemical processes can be used to capture and convert $CO_2$ to a different form. For such processes to have a minimal carbon footprint, the entire process and the aspects that flow into and out of the process must be considered. Such processes have inputs such as electricity, fuel, water, as well as reagents that also require electricity, fuel, and water to make. Reducing $CO_2$ emissions by taking these inputs into account and managing them more efficiently can lead to more sustainable carbon-capture solutions.

SUMMARY OF THE INVENTION

In some aspects, disclosed herein is a method of effectively reducing an amount of carbon dioxide from a gas stream comprising the steps of (a) generating an aqueous hydroxide solution in a chloro-alkali cell; (b) diluting the aqueous hydroxide solution to obtain a 5% to 15% by weight aqueous hydroxide solution; (c) admixing the diluted aqueous hydroxide solution with a first portion of a gas stream containing carbon dioxide to produce carbonate in a first admixture; and (d) removing water from the first admixture in a water removal unit; (e) after step (d), admixing the first admixture with a second portion of the gas stream to produce bicarbonate in a second admixture. In some embodiments, 20% to 30% of water is removed from the first admixture in step (d). In some embodiments, 23% to 26% of water is removed from the first admixture in step (d). In some embodiments, the diluted aqueous hydroxide solution has a concentration of 8% to 10%. In some embodiments, the method further comprises the steps of separating a liquid phase from a solid phase of the second admixture and adding as a diluent at least a portion of the liquid phase to the aqueous hydroxide solution in step (b). In some embodiments, the second admixture comprises a liquid phase and a solid phase and the method further comprises the steps of separating the liquid phase from the solid phase and returning at least a portion of the liquid phase to the second admixture where the first admixture is admixed. In some embodiments, the second admixture comprises a liquid phase and a solid phase and the method further comprises the steps of separating the liquid phase from the solid phase and adding at least a portion of the liquid phase to the water removal unit. In some embodiments, generating the aqueous hydroxide comprises: obtaining a group-1 or group-2 salt; admixing the salt with acid and water, acid and steam, or acid, water, and steam to produce a protonated salt solution; and electrolyzing the protonated salt solution to produce the hydroxide, a hydrogen gas, and a chlorine gas. In some embodiments, the method further comprises removing water from the hydrogen gas and transferring the water removed from the hydrogen gas to a condensate storage tank. In some embodiments, the method further comprises removing water from the first portion and the second portion of the gas stream after exiting the first admixture and second admixture, respectively, and transferring the water removed from the gas stream to a condensate storage tank. In some embodiments, the second admixture comprises a liquid phase and a solid phase and the method further comprises the steps of separating the liquid phase from the solid phase; drying the solid phase in a dryer; removing the water from an exhaust of the dryer; and transferring the water removed from the exhaust to a condensate storage tank. In some embodiments, the gas stream is a natural gas stream or a flue-gas stream. In some embodiments, the hydroxide is in the form of sodium hydroxide.

In some aspects, disclosed herein is a system for effectively reducing carbon oxide from a gas stream comprising: a gaseous stream comprising a carbon oxide; a first set of mixing equipment adapted to admix an aqueous hydroxide solution with a first portion of the gas stream to create a first admixture in which carbon oxide in the gas stream can react with the hydroxide to produce a carbonate product in a first liquid outflow; a water removal equipment adapted to remove a portion of the water from the first liquid outflow to yield a concentrated liquid outflow; a second set of mixing equipment adapted to admix the concentrated liquid outflow with a second portion of the gas stream to create a second admixture in which carbon oxide in the gas stream can react with the carbonate to produce bicarbonate products. In some embodiments, the concentrated liquid outflow has between 20% and 30% or between 23% and 27% by volume less water than the first liquid outflow. In some embodiments, the chlor-alkali cell is adapted to electrochemically produce a first aqueous hydroxide solution, e.g., a concentrated aqueous hydroxide solution, with a protonated brine solution and a dilution unit adapted to dilute the first aqueous hydroxide solution to produce the second aqueous hydroxide solution. In some embodiments, the second aqueous hydroxide solution is between 5% and 15% by weight. In some embodiments, the system further comprises a solid-liquid separator and a holding tank, where the solid-liquid separator is adapted to separate a solid phase from a liquid phase in the second admixture and the holding tank is in fluid communication with the solid-liquid separator to receive the liquid phase. In some embodiments, the holding tank is in fluid communication with one or more of the dilution unit, the water removal equipment, and the second set of mixing equipment. In some embodiments, the system further comprises a gas-vapor separator and a condensate holding tank, where the gas-vapor separator receives the gas stream downstream from the first and second mixing equipment and removes vapor from the gas stream and the holding tank is in fluid communication with the gas-vapor separator to receive a liquid from the gas-vapor separator. In some embodiments, the system further comprises a gas-vapor separator and a condensate holding tank, where the gas-vapor separator receives the $H_2$ stream exiting the chloro-alkali cell and removes vapor from the gas stream and the holding tank is in fluid communication with the gas-vapor separator to receive a liquid from the gas-vapor separator. In some embodiments, the system further comprises a dryer to receive the solid phase, a gas-vapor separator receiving an exhaust stream of the dryer, and a condensate holding tank, where the gas-vapor separator receives the exhaust stream exiting the dryer and removes vapor from the exhaust stream and the holding tank is in fluid communication with the gas-vapor separator to receive a liquid from the gas-vapor separator.

As used herein, the phrase "gas stream" comprises a gas stream with at least one acid gas. Examples of a gas stream include a raw natural gas stream and a waste gas stream, such as a flue-gas stream or a waste stream from a chemical processing plant. Gas streams can be generated by a power generation process that uses combustion of carbon-based fuels, a manufacturing process, an industrial process, or a natural reservoir extraction process.

An acid gas can be carbon-, sulfur-, and/or nitrogen-based and can comprise $H_2S$, $SO_x$, $NO_x$, CO, and $CO_2$. Nitrogen oxides ($NO_x$) comprise one or more of NO, $NO_2$, $N_2O_3$, $N_2O_5$, and associated dimers. Sulfur oxides ($SO_x$) comprise one or more of $SO_2$ and $SO_3$. Other acid gases that can be removed from described embodiments include HF and HCl. Carbon oxides comprises CO and/or $CO_2$ As used herein, the terms "carbonates" or "carbonate products" is generally defined as mineral components containing the carbonate group $[CO_3]^{2-}$. Thus, the terms encompass both carbonate/bicarbonate mixtures and species containing solely the carbonate ion. The terms "bicarbonates" or "bicarbonate products" is generally defined as mineral components containing the bicarbonate group $[HCO_3]^{1-}$. Thus, the terms encompass both carbonate/bicarbonate mixtures and species containing solely the bicarbonate ion.

As used herein, the term "sequestration" is used to refer generally to techniques or practices whose partial or whole effect is to remove one or more acid gases, such as $CO_2$, from point emissions sources and to store that acid gas in some form so as to prevent or delay its release to the atmosphere. Use of this term does not exclude any form of the described embodiments from being considered "sequestration" techniques.

As used herein, the terms "low-voltage electrolysis" and "LVE" are used to refer to electrolysis at current densities below about 2 $kA/m^2$.

The term "coupled" is defined as connected, although not necessarily directly, and not necessarily mechanically. Coupled can include "being in fluid communication with." Two items are "couplable" if they can be coupled to each other, and, when coupled, may still be characterized as "couplable." Unless the context explicitly requires otherwise, items that are couplable are also decouplable, and vice-versa. One non-limiting way in which a first structure is couplable to a second structure is for the first structure to be configured to be coupled (or configured to be couplable) to the second structure.

The terms "a" and "an" are defined as one or more unless this disclosure explicitly requires otherwise. The term "another" is defined as at least a second or more. The terms "substantially" and "about" are defined as at least close to (and includes) a given value or state (preferably within 10% of, more preferably within 1% of, and most preferably within 0.1% of).

The terms "substantially," "approximately" and "about" are defined as being largely but not necessarily wholly what is specified (and include wholly what is specified) as understood by one of ordinary skill in the art. In any disclosed embodiment, the term "substantially," "approximately," or "about" may be substituted with "within [a percentage] of" what is specified, where the percentage includes 1, 5, and 10 percent.

The term "effective," as that term is used in the specification and/or claims, means adequate to accomplish a desired, expected, or intended result.

The preposition "between," when used to define a range of values (e.g., between x and y) means that the range includes the end points (e.g., x and y) of the given range and the values between the end points.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, any of the present devices, systems, and methods that "comprises," "has," "includes" or "contains" one or more elements possesses those one or more elements, but is not limited to possessing only those one or more elements. Likewise, an element of a system or method that "comprises," "has," "includes" or "contains" one or more features possesses those one or more features, but is not limited to possessing only those one or more features. Additionally, terms such as "first" and "second" are used only to differentiate components, and not to limit the different components to a particular order.

Furthermore, a structure that is capable of performing a function or that is configured in a certain way is capable or configured in at least that way, but may also be capable or configured in ways that are not listed.

The feature or features of one embodiment may be applied to other embodiments, even though not described or illustrated, unless expressly prohibited by this disclosure or the nature of the embodiments.

Any of the present devices, systems, and methods can consist of or consist essentially of—rather than comprise/include/contain/have—any of the described elements and/or features and/or steps. Thus, in any of the claims, the term "consisting of" or "consisting essentially of" can be substituted for any of the open-ended linking verbs recited above, in order to change the scope of a given claim from what it would otherwise be using the open-ended linking verb.

Details associated with the embodiments described above and others are presented below.

BRIEF DESCRIPTION OF THE DRAWINGS

The following drawings illustrate by way of example and not limitation. For the sake of brevity and clarity, every feature of a given structure may not be labeled in every figure in which that structure appears. Identical reference numbers do not necessarily indicate an identical structure. Rather, the same reference number may be used to indicate a similar feature or a feature with similar functionality, as may non-identical reference numbers.

DETAILED DESCRIPTION

The present invention relates to a carbon dioxide conversion system with water recovery and recycling. Embodiments of the methods and apparatuses of the described invention comprise one or more of the following general components: (1) an aqueous decarbonation process whereby gaseous $CO_2$ is absorbed into an aqueous caustic mixture having a concentration of 5 to 15% by weight or more particularly 8-10% by weight and reacted with the hydroxide in the mixture to form carbonate and/or bicarbonate products; (2) a separation process whereby the carbonate and/or bicarbonate products are separated from the liquid mixture; (3) a brine electrolysis process for the production of the sodium hydroxide that is used in the absorbent fluid in the decarbonation process; (4) a dilution process for producing the absorbent fluid from the sodium hydroxide; (5) a water recovery processes and recycling schemes; and (6) further processing or utilization of by-products from the decarbonation, oxidation, and electrolysis processes, including chlorine gas, hydrogen gas, hydrochloric acid, carbonates and bicarbonates. Each of these processes and the components utilized to execute is explained in further detail below.

While many embodiments of the present invention consume some energy and require water to accomplish the absorption of acid gases from a gas stream and to accomplish the other objectives of embodiments of the present invention as described herein, one advantage of certain embodiments of the present invention is that they provide ecologic efficiencies that are superior to those of the prior art, as they absorb most or all of the acid gases, including at least one or any combination of $CO_2$, $H_2S$, $SO_x$, and $NO_x$ with a reduced water footprint and a water waste stream that may be suitable for generating potable water.

In addition to conserving water, described embodiments sequester carbon-dioxide and other acid gases into economically useful chemicals and co-incidentally produce useful by-products such as carbonates (e.g., sodium carbonate), bicarbonates (e.g., sodium bicarbonate), hypochlorites (e.g., sodium hypochlorite), hydrochloric acid, chlorine gas, and hydrogen gas. Because the by-products of the described processes are economically useful, those values offset the costs of acid gas removal and, in properly designed systems, potentially make the sequestration process profitable in itself.

I. Flow Diagram: Absorption of Carbon Dioxide and Other Acid Gases

Figure 1A:
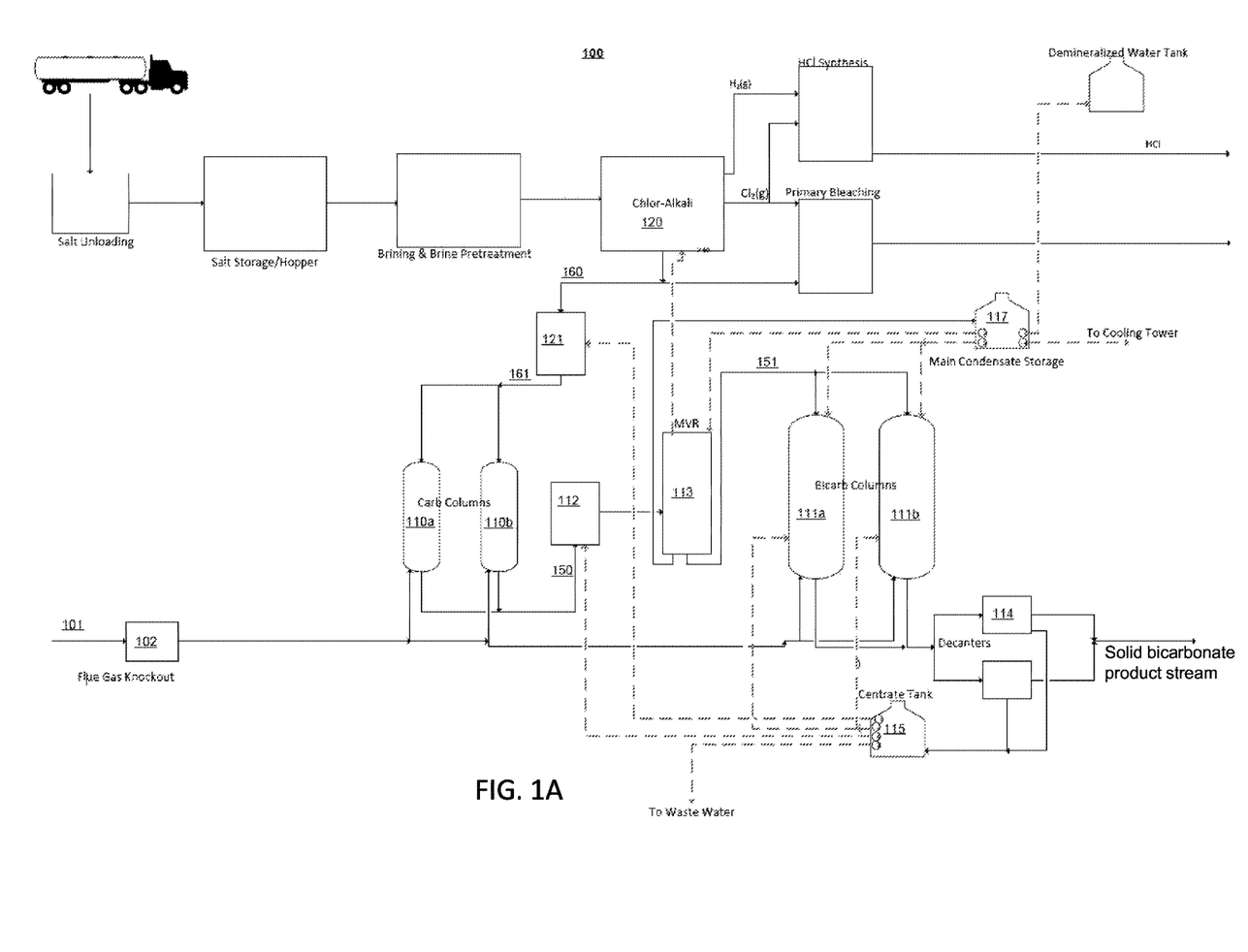
FIG. 1A is a process-flow diagram showing primary features of one embodiment of the present disclosure.
Figure 1B:
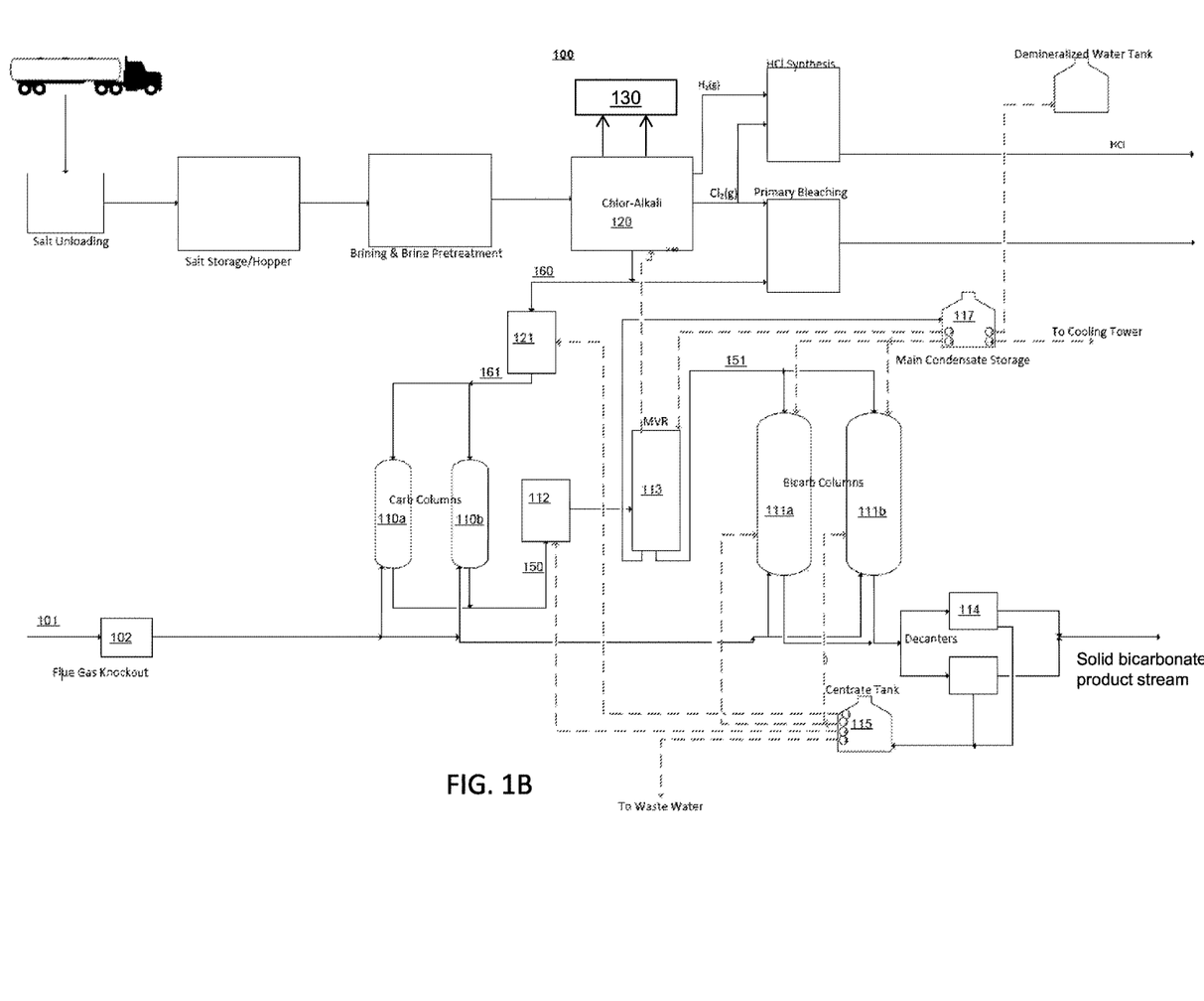
FIG. 1B is a process-flow diagram showing primary features of another embodiment of the present disclosure.
Figure 1C:
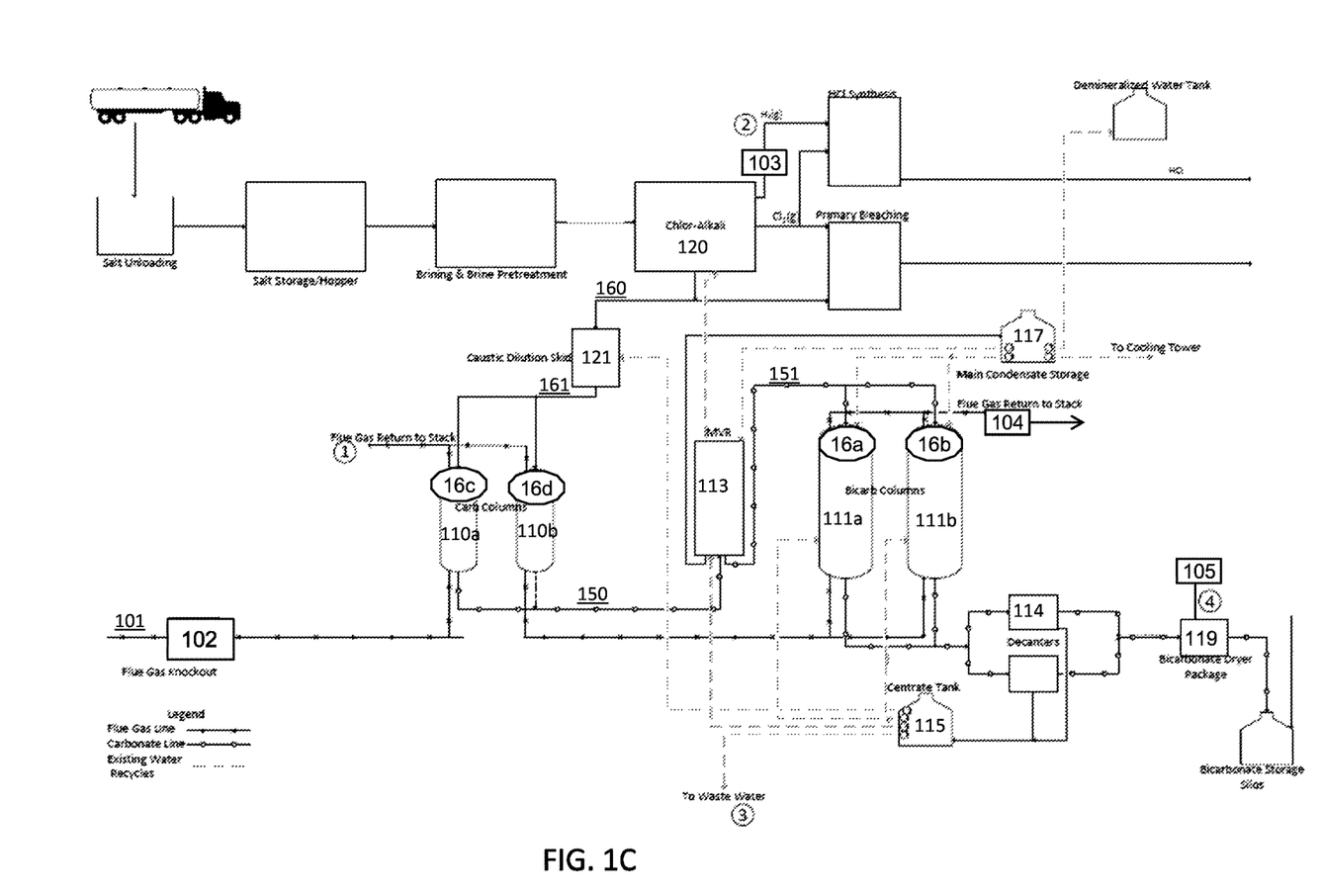
FIG. 1C is a process-flow diagram showing primary features of yet another embodiment of the present disclosure.

FIG. 1 depicts a simplified process-flow diagram illustrating general, exemplary embodiments of the apparatuses and methods of the present disclosure.

In the embodiment shown in FIGS. 1A to 1C, the gas stream 101 to be decarbonated can enter system 100 at one or more Absorption/Carbonation Columns 110a, 110b or one or more Bubble/Bicarbonation Columns 111a, 111b, configured in series. Gas stream 101 containing $CO_2$ and possibly other acid gases can be differentially introduced into Columns 110a, 110b, 111a, and 111b. Hydroxide from the Chlor-alkali Cell 120 reacts with carbon dioxide and other acid gases present in gas stream 101 in the Absorption/Carbonation Column 110. In various embodiments, the concentration of the alkali hydroxide solution 161 fed into Columns 110a and 110b is between 5-25% by weight, such as 5-15% by weight. Aside from $CO_2$, the other acid gases removed through such process can include at least one of $H_2S$, $NO_x$, $SO_x$, and any combination thereof. Examples of the possible chemical reactions occurring in Columns 110a, 110b include reactions 1 to 6. In some applications, it may be preferred to remove the sulfur- and nitrogen-based acid gases in a separate process in order to yield a higher purity bicarbonate product.

$CO_2$:

$$2NaOH + CO_2 \rightarrow Na_2CO_3 + H_2O \qquad (1)$$

$H_2S$:

$$H_2S(g) + 2NaOH(aq) \rightarrow Na_2S(aq) + 2H_2O(l) \qquad (2)$$

$SO_x$:

$$2SO_2(g) + 2H_2O(l) + O_2(g) \rightarrow 2H_2SO_4(aq) \qquad (3)$$

$$SO_3(g) + H_2O(l) \rightarrow H_2SO_4(aq) \qquad (4)$$

$$H_2SO_4(aq) + 2NaOH(aq) \rightarrow Na_2SO_4(aq) + 2H_2O(l) \qquad (5)$$

$NO_x$:

$$2NO_2(g) + 2NaOH(aq) \rightarrow NaNO_3(aq) + NaNO_2(aq) + H_2O(l) \qquad (6)$$

The liquid phase 150 comprising sodium carbonate from this reaction is then transported to Bubble/Bicarbonation Columns 111a, 111b to cause conversion of carbonate to bicarbonate by reaction with residual $CO_2$ in the liquid phase, as represented by equation 7.

$$Na_2CO_3 + CO_2 + H_2O \rightarrow 2NaHCO_3 \qquad (7)$$

Columns 110a, 110b can be any wet scrubbing configuration suitable to bring a gas stream into contact with the liquid phase containing the 5-15% alkali hydroxide solution, so as to effectively reduce the amount of $CO_2$ and other acid gases present in the gas stream but also to minimize carbonate precipitation. Columns 111a, and 111b can be any wet scrubbing configuration suitable to bring the gas into contact with the liquid phase from Columns 110a, and 110b, so as to effectively reduce the amount of $CO_2$ present in the gas stream. In various embodiments, Columns 110a, 110b, 111a, and 111b can be a spray-tower, a packed or unpacked bubble column or a series thereof, or any other mixing configuration suitable to bring the absorbent solution(s) into effective contact with the gas stream.

The process of decarbonation (or removal of $CO_2$ from the gas) occurring in Carbonation Columns 110a, 110b and Bicarbonation Columns 111a, 110b can be further modified, optimized and scaled up using the principles and techniques of chemistry, chemical engineering, and/or materials science as applied by a person skilled in the art and taught, for example, in U.S. Pat. No. 7,727,374, which is hereby incorporated by reference in its entirety. In particular, in various embodiments, the formation of carbonate products in Columns 110a, 110b and bicarbonate products in Columns 111a, 110b can within range of temperatures and pressures. With respect to temperature, by way of example, the incoming gas can be between about 20° C. to about 140° C. and the incoming liquid reagent feed(s) can be between about 10° C. to about 50° C., such as 10° C., 12° C., 15° C., 17° C., 20° C., 22° C., 25° C., 27° C., 30° C., 32° C., 35° C., 37° C., ° C., 40° C., 42° C., 45° C., 47° C., 50° C., or any temperature or range derivable therein. The temperature within Carbonation Columns 110a, 110b and Bicarbonation Columns 111a, 110b can be between about 40° C. to about 60° C., such as about 40° C., 42° C., 45° C., 47° C., 50° C., 52° C., 55° C., 57° C., 60° C. or any temperature or range derivable therein. Also, by way of example, the headspace pressure in Columns 110a, 110b can be between about 1 atm to about 3 atm.

In advance of entering Columns 110a, 110b, 111a, or 111b, if desired, gas stream 101 can be processed to remove any heavy metals and residual water content, e.g., in a Vapor-Liquid Separator 102. (A vapor-liquid separator is also referred to herein in as a Knockout Tank.) An aqueous hydroxide solution produced in the chloro-alkali unit 120 or from the Dilution Unit 121 can be used in the Vapor Liquid Separator 102 to facilitate heavy metal precipitation. The solution can be sprayed, such as a mist, in a vessel to mix with incoming flue gas. Such processing may be needed when cleaning a gas stream containing heavy metals and residual water with dissolved contaminants.

Before being fed into Bubble/Bicarbonation Columns 111a, 111b, liquid stream 150 coming from Columns 110a, 110b can be fed to water removal apparatus, such as a Vapor-Liquid Separator 112 and/or a Mechanical Vapor Recompression (MVR) Evaporator 113. In various embodiments, liquid stream 150 from Columns 110a, 110b can be fed to Separator 112 where vapor is removed from the liquid stream. Liquid stream 150 can then be fed to MVR Evaporator 113 where more water is taken out of the system. With the incorporation of Vapor Separator 112 and MVR Evaporator 113, an amount between 20% to 30% by volume, such as 20%, 21%, 22%, 23%, 24%, 25%, 26%, 27%, 28%, 29%, or 30% by volume of water or any percentage or range derivable therein is removed from liquid stream 150. Of note, an MVR evaporator is not used after Columns 111a, 111b to remove water from liquid stream 150, as this would unwantedly shift some bicarbonate to carbonate.

Some or all of the water removed from the liquid stream by Separator 112 and/or MVR 113. This extracted water can be stored in Condensate Storage 117 and available for use in System 100. Water in Condensate Storage Tank 117 can be used at various points in the system, such as Dilution Skid 121 or Chloro-Alkali Cell 120.

From MVR 113, the concentrated liquid stream 151 is transported to Bicarbonation Columns 111a, 111b where a second portion of the gas stream is admixed with liquid stream 151.

A slurry 152 exits Columns 111a, 111b and goes to liquid-solid separator, where the solid phase comprising sodium bicarbonate is separated from the liquid phase. In the embodiment shown, Decanter Centrifuges 114a, 114b can be used to separate the liquid phase from the solid phase.

The liquid phase exiting Decanter Centrifuges 114a, 114b is held in Centrate Tank 115. The liquid phase can comprise sodium ions, hydroxide ions, carbonate ions, and bicarbonate ions. In various embodiments, the liquid phase can be reintroduced back into System 100 at one or more of the following apparatuses (as indicated with the dashed lines emanating from Tank 115): Dilutions Skid 121, Bicarbonation Columns 111a, 111b, and Vapor Separator 112.

After passing through one or both of Columns 110a, 110b, 111a, and 111b, the gas stream has significantly reduced levels of $CO_2$ and other acid gases. The gas stream can then proceed to the next step, which will depend on the specific application within which this described process is being utilized. For example, an industrial process gas stream may require further cleaning or be directly discharged into the atmosphere. In other embodiments, such as in the context of cleaning a natural gas stream, the gas stream can be transported for use at another location, utilized in power generation, or stored for later use.

In various embodiments, reagent-generating processes and apparatuses are integrated into System 100 to generate reactants for the above-described absorption processes and can include a Chlor-alkali Cell 120 and a Caustic Dilution Skid 121. Choro-alkali Cell 120 uses power to drive a reaction represented by equation 14.

$$2NaCl+2H_2O \rightarrow 2NaOH+Cl_2+H_2 \qquad (14)$$

The sodium hydroxide solution 160 generated in Cell 120 can be delivered to Caustic Dilution Skid 121 where water is added to dilute the solution to a concentration between 5% to 15% by weight, such as 5%, 6%, 7%, 8%, 9%, 10%, 11%, 12%, 13%, 14%, 15% or any value or range derivable therein. In various embodiments, as mentioned above, water/diluent that is fed into Dilution Skid 121 can be, at least in part, waste water stored in Centrate Tank 115. Once diluted, the alkali solution 161 can be evenly or differentially fed into Columns 110a, and/or 110b. The concentration of alkali solution 161 fed into Columns 110a and/or 110b is selected to effectively reduce the amount of $CO_2$ and other acid gases present in the gas stream but also to avoid carbonate precipitation. In some embodiments, this concentration is between about 8% to 10% by weight.

Auxiliary processes and apparatuses can be integrated into System 100 to generate commodity products from the by-products generated in the chloro-alkali cell, namely $H_2$ and $Cl_2$. For example, Hypochlorite Reactor 130, at least a portion of the chlorine, also from Chlor-alkali Cell 120, can be contacted with (e.g., bubbled through) at least a portion of the alkali hydroxide to produce a hypochlorite solution according to reaction 15. The sodium hypochlorite can be transported to market as salable bleach.

$$2NaOH+Cl_2 \rightarrow NaOCl+NaCl+H_2O. \qquad (15)$$

To capture the chlorine gas generated in the Chlor-alkali Cell 120, the chlorine and hydrogen produced from this reaction can be delivered to an HCl Burner 140. For example, chlorine gas can be reacted with the hydrogen gas, also from Cell 120, in an HCl Burner 140. The net reaction can be represented by equation 16:

$$Cl_2+H_2 \rightarrow 2HCl \qquad (16)$$

Other auxiliary processes and apparatuses can be integrated into System 100 to reduce the carbon footprint through the recovery of some of the electricity used to drive the various components, e.g., Chloro-alkali Cell 120, Decanter Centrifuges 114a and 114b, pumps, etc. For example, with reference to FIG. 1B, a system similar to that of FIG. 1A is shown except that at least some of the by-products, $H_2$ and $Cl_2$, from Cell 120 can be fed to a $H_2$—$Cl_2$ Fuel Cell 130 to generate electricity that can be used to power one or more of the components in the process, at least in part.

Through the above-described process, $CO_2$ is captured from the gaseous stream, primarily in the form of bicarbonate. In addition, many of the generated by-products can be sold for economic gain, such as, sodium hypochlorite and sodium bicarbonate. Water can be transferred from one point in the system and utilized in another point to improve the overall efficiency of the system. Lastly, any sulfate and nitrate byproducts can be easily disposed of or can be further processed to generate fertilizer for economic gain.

These methods and devices can be further modified, optimized and scaled up using the principles and techniques of chemistry, chemical engineering, and/or materials science as applied by a person skilled in the art. Such principles and techniques are taught, for example, in U.S. Patent Application Publications 2006/0185985 and 2009/0127127, U.S. Pat. No. 7,727,374, filed Sep. 22, 2005, U.S. Provisional Patent Application No. 60/718,906, filed Sep. 20, 2005; U.S. Provisional Patent Application No. 60/642,698, filed Jan. 10, 2005; U.S. Provisional Patent Application No. 60/612,355, filed Sep. 23, 2004, U.S. patent application Ser. No. 12/235, 482, filed Sep. 22, 2008, U.S. Provisional Application No. 60/973,948, filed Sep. 20, 2007, U.S. Provisional Application No. 61/032,802, filed Feb. 29, 2008, U.S. Provisional Application No. 61/033,298, filed Mar. 3, 2008, International Application No. PCT/US08/77122, filed Sep. 19, 2008, and U.S. Patent Publication No. 2013/0202516, filed Jan. 11, 2013. The entire text of each of the above—referenced disclosures (including any appendices) is specifically incorporated by reference herein without disclaimer.

The above examples were included to demonstrate particular embodiments of the invention. However, those of skill in the art should, in light of the present disclosure, appreciate that many changes can be made in the specific embodiments which are disclosed and still obtain a like or similar result without departing from the spirit and scope of the invention.

IV. Aqueous Decarbonation (Absorption) of CO2 from Gas Streams and its Conversion into Carbonate and Bicarbonate As noted above, the apparatuses and methods of the present disclosure employ an aqueous decarbonation process via Absorption/Carbonation Columns 110a/110b and Bubble/Bicarbonation Column s 111a/111b, whereby gaseous $CO_2$ is absorbed into an aqueous caustic mixture where it then reacts with the hydroxide to form carbonate products and carbonate to form bicarbonate products.

In many embodiments of the present invention, sodium hydroxide is used as the primary absorbent fluid. Sodium hydroxide, in various concentrations, is known to readily scrubbing reagent of $CO_2$. When carbon dioxide is brought into contact with aqueous sodium hydroxide, a range of products from pure sodium bicarbonate ($NaHCO_3$) to pure sodium carbonate ($Na_2CO_3$) can be formed, and differing conditions can be produced that will drive the equilibrium in either direction. Preferably, most or nearly all of the carbon dioxide can be reacted in this manner.

In some embodiments, when carbon dioxide is brought into contact with aqueous sodium hydroxide, the fluid within the reaction columns approximates the behavior shown in equation 13. The two reaction process that take place are:
1. An initial absorption phase in which $CO_2$ is readily absorbed: The absorption ability of the fluid declines as the $OH^-$ concentration declines, and absorption ends and in some instances reverses when the $OH^-$ concentration is consumed. The reaction is exothermic during this portion and forms almost exclusively carbonate.
2. A secondary conversion phase in which $CO_2$ is absorbed, but less favorably than the previous step. As $CO_2$ enters the liquid, it forms carbonic acid. This carbonic acid then reacts with the entering carbonate solution, forming a sodium bicarbonate solution by the following net stoichiometry:

$$Na_2CO_3(aq) + H_2O(l) + CO_2(aq) \rightarrow 2NaHCO_3(aq) \quad (13)$$

In various embodiments, as illustrated in FIG. 1, the formation of bicarbonate occurs in two separate columns, with one or more reactors being used to produce sodium carbonate and the other one or more reactors being used to produce sodium bicarbonate. In various embodiments, each chamber can be a spray-tower, a packed or unpacked bubble column or a series thereof, or any other mixing configuration suitable to bring the hydroxide solution or carbonate solution in effective contact with the gas stream for absorption to carbonate in the case of Columns 110a and 110b and conversion to bicarbonate in the case of Columns 111a and 111b.

These methods and devices can be further modified, optimized and scaled up using the principles and techniques of chemistry, chemical engineering, and/or materials science as applied by a person skilled in the art. Such principles and techniques are taught, for example, in U.S. Pat. No. 7,727, 374, filed Sep. 22, 2005, U.S. Provisional Patent Application No. 60/718,906, filed Sep. 20, 2005; U.S. Provisional Patent Application No. 60/642,698, filed Jan. 10, 2005; U.S. Provisional Patent Application No. 60/612,355, filed Sep. 23, 2004, U.S. patent application Ser. No. 12/235,482, filed Sep. 22, 2008, U.S. Provisional Application No. 60/973,948, filed Sep. 20, 2007, U.S. Provisional Application No. 61/032,802, filed Feb. 29, 2008, U.S. Provisional Application No. 61/033,298, filed Mar. 3, 2008, International Application No. PCT/US08/77122, filed Sep. 19, 2008, and U.S. Patent Publication No. 2013/0202516, filed Jan. 11, 2013. The entire text of each of the above-referenced disclosures (including any appendices) is specifically incorporated by reference herein without disclaimer.

V. Separation of Products

With regard to the reaction in Column 110a, 110b and/or 111a, 111b, the formation of sodium hydrogen carbonate ($NaHCO_3$ or sodium bicarbonate) and sodium carbonate ($Na_2CO_3$ or soda ash) occurs over a wide range of temperatures and pressures and provides different end-points of the equilibrium given different partial pressures of $CO_2$. By manipulating the basic concentration, temperature, pressure, reactor size, and fluid depth, formation of carbonate and/or bicarbonate precipitants may occur.

Alternatively, carbonate/bicarbonate products may be separated from their water by the exchange of heat energy with incoming gases, in some preferred embodiments. Moreover, in certain embodiments the heat for the separation process may be derived from the hydrogen produced in the original electrolysis or from creative uses of the waste-heat contained in the incoming flue-gas stream.

The exiting liquid stream from the Columns 111a and/or 111b, depending upon absorber/system design, may include water, $NaHCO_3$, $Na_2CO_3$, and other dissolved gases in various equilibria. In one embodiment, to separate/remove the exiting liquid streams, e.g., removing/separating the water from the carbonates (in this sense of the word, "carbonates" means mixtures of carbonate and bicarbonate), the liquid stream may be decanted with a Decanter Centrifuge 114a/114b.

In a carbonate separation precipitation method according to certain embodiments, the carbonate equilibrium sterically binds carbon-dioxide and absorbs the gas on contact, with a substantially instantaneous conversion to carbonate ion. The reaction chain may be mass-transport limited such that once the carbon-dioxide has been absorbed by the base, the subsequent ionic reactions occur at rapid pace.

In one embodiment, to separate/dispose of the exiting liquid streams, e.g., removing/separating the water from the nitrates and sulfates, can involve heating the liquid to evaporate the water. In another embodiment, the sulfate can be isolated by passing the liquid stream through a sulfate recovery process, that separates sulfates from NaCl and then add $CaCl_2$ to convert the $Na_2SO_4$ to $CaSO_4$, which precipitates. Similarly, in other embodiments, the aqueous phase can be reacted with ammonia to generate ammonium sulfate and/or ammonium nitrate according to equations 17 and 18.

In this manner, bicarbonate can be regenerated. In addition, the ammonium sulfate and/or ammonium nitrate products can be utilized as a fertilizer.

$$Na_2SO_4(aq)+2NH_3(aq)+2H_2O(l)+2CO_2(g) \rightarrow (NH_4)_2SO_4(aq)+2NaHCO_3(s) \quad (17)$$

$$NaNO_3(aq)+NH_3(aq)+H_2O(l)+CO_2(g) \rightarrow NH_4NO_3(aq)+NaHCO_3(s) \quad (18)$$

In other embodiments, the liquid streams may be displaced to evaporation tanks/fields, where the liquid, such as water, may be carried off by evaporation.

VI. Electrolysis for the Production of Absorbent Fluids at Low Energies

As noted above, in certain embodiments, the apparatuses and methods of the present disclosure employ a Chlor-alkali cell 120 for production of the sodium hydroxide that is used as the absorbent fluid in the decarbonation process. Chlor-alkali electrolysis is an electrochemical process primarily used in the production of concentrated sodium hydroxide (caustic soda) and chlorine gas, and is typically described throughout the relevant literature by equation 14:

$$2NaCl+2H_2O \rightarrow 2NaOH+H_2(g)+Cl_2(g) \quad (14)$$

Such electrolysis is typically accomplished by three general types of standard electrolysis cells: diaphragm, mercury, and membrane cells. Each of these types of cells produces the same output products from the same input reactants. They differ from each other primarily in the way the reactants and products are separated from each other.

In one embodiment, a membrane cell may be used due to several factors. First, environmental concerns over mercury have reduced the demand for the mercury cell. Second, the diaphragm cells may produce a relatively weak caustic product which contains significant concentrations of salt and chloride ion and requires considerable subsequent reprocessing/separation to remove the significant salt content from the caustic. Third, improvements in fluorinated polymer technology have increased the life-time and electrical efficiency of membrane cell technology, where membrane lifetimes in excess of five years are routinely guaranteed in the industrial markets. Further, the power-per-ton-of-caustic efficiencies exceeds those of both diaphragm and mercury cells in preferred implementations.

Many preferred embodiments may employ membrane cells in this function. Membrane cells have several advantages over other chlor-alkali electrolysis processes. First, membrane cells neither contain nor produce any environmentally sensitive emissions (e.g., mercury) and are electrically efficient when compared with diaphragm and mercury cells. They also employ a concentrated/dilute/make-up NaCl loop such that they may be well-suited for use as a continuous "salt loop" processing unit. NaOH produced in membrane cells without further evaporation/concentration may have a concentration of 30-33% NaOH by weight. Membrane cell technology may also be easily scaled from laboratory to plant-size production by the addition of small incremental units.

Further, hydrogen produced by membrane cells is "clean," approximately "electronic grade," and relatively clear of NaCl or other contamination. As such, hydrogen may be compressed and tanked off as electronic-grade $H_2$ gas, used for power-production on-site such as combustion mix with low-grade coal or for combustion-technology gains. Alternatively, the hydrogen may be used for a boiler fuel for the separation processes. Additionally, chlorine gas produced by the membrane process is less "wet" than that produced by other standard electrolytic processes. As such, a one-stage compression cycle may be sufficient for production of water-treatment grade chlorine.

In certain embodiments, acid is added to the solution before it is electrolyzed. The acid can be any form of acid that can provide protonation to the solution, including but not limited to hydrochloric acid. Those of ordinary skill will understand that it is possible to obtain similar chemistry and electrolysis with any number of acids or mixtures of acids. In some embodiments, the acid is hydrochloric acid generated in Burner 140 through the combustion of byproducts, $H_2$ and $Cl_2$. The amount of acid added to the solution can be based on a determination of the optimum protonation rate that achieves the lowest energy to produce reactants and the highest energy to recover from products.

These methods and devices can be further modified, optimized and scaled up using the principles and techniques of chemistry, chemical engineering, and/or materials science as applied by a person skilled in the art. Such principles and techniques, including techniques for using low-voltage electrolysis (LVE) to improve the thermodynamic efficiency of the process, are taught, for example, in U.S. Pat. No. 7,727,374, filed Sep. 22, 2005, U.S. Provisional Patent Application No. 60/718,906, filed Sep. 20, 2005; U.S. Provisional Patent Application No. 60/642,698, filed Jan. 10, 2005; U.S. Provisional Patent Application No. 60/612,355, filed Sep. 23, 2004, U.S. patent application Ser. No. 12/235,482, filed Sep. 22, 2008, U.S. Provisional Application No. 60/973,948, filed Sep. 20, 2007, U.S. Provisional Application No. 61/032,802, filed Feb. 29, 2008, U.S. Provisional Application No. 61/033,298, filed Mar. 3, 2008, International Application No. PCT/US08/77122, filed Sep. 19, 2008, and U.S. Patent Publication No. 2013/0202516, filed Jan. 11, 2013. The entire text of each of the above-referenced disclosures (including any appendices) is specifically incorporated by reference herein without disclaimer.

VII. Water Management Scheme

In certain embodiments, the apparatuses and methods of the present disclosure employ water separation and reuse techniques. As described above, water removal units, such as Vapor Separator 112 and MVR Evaporator 113 can be used between Columns 110*a*/110*b* and Columns 111*a*/111*b* to remove water from the system for repurposing. It was also described that the centrate from Decanter Centrifuge 114 can also be recovered and repurposed. In addition to the above, other sources of water in the system can include vapor extracted from the liquid stream, the $H_2$ line, and the gas stream leaving the Carbonate and Bicarbonate Columns.

An embodiment with additional water recovery features can be incorporated into System 100 as shown in FIG. 1C. Water Knockout 103 can intercept the $H_2$ line before it feeds into the HCl Burner, for example. The water from the $H_2$ line may be usable as reverse osmosis quality water.

In addition, Water Knockout 104 can be incorporated into the system to remove water. The heat, generated by the reactions of caustic and carbonate with carbon dioxide, and the partial pressure of water are the driving forces behind water evaporation into the column head space and the gas stream. Specifically, Carbonate Columns 110*a* and/or 110*b* and/or Bicarbonate Columns 111*a* and/or 111*b* operate between 40° C. to 60° C., which creates water vapor in the gas stream exiting the Columns. To capture this water, Water Knockout 104 can intercept the gas stream after Carbonate Columns 110*a* and/or 110*b* and/or Bicarbonate Columns 111*a* and/or 111*b*. Demisters 16*a*-*d* can be located at the top of each column to prevent water droplets from be carried with the gas stream which will thereby enhance the purity of the water condensed in Knockout 104.

In addition to the above, the water obtained from Knock-out 102 can be filtered with a carbon filtration system and may be repurposed. For example, the collected gas stream condensate may initially contain heavy metals and other pollutants such as ($SO_x$ and $NO_x$) removed from the incoming flue gas stream. After passing through the carbon filter system, all of the heavy metals and $SO_x$ (in the form of sulfates) should be removed, in addition to some of the $NO_x$. If the concentration of $NO_x$ (converted to the form of sodium nitrate, $NaNO_3$) was sufficiently low, this water could be repurposed. A water softening system may be required to lower the concentration if above the acceptable threshold for the system.

In the embodiments shown, the generated solid bicarbonate is dried in Dryer 119. With such embodiments, a baghouse can be attached to the final stage dryer for the generated sodium bicarbonate, which captures sodium bicarbonate "fines" to reduce the risk of losing product. As the remaining water in the bicarbonate is evaporated in the drying process, it passes through the baghouse as vapor. A Condenser 105 could be attached post-baghouse to recover this water stream for repurposing. This water stream is likely to have a higher purity and may be usable as reverse osmosis quality water.

VIII. Recovery of Waste-Heat

Because certain embodiments of the present invention are employed in the presence of a power-plant or large emission of $CO_2$ in the form of flue-gas or other hot gases from combustion, there may be ample opportunity to utilize this 'waste' heat in the optimization of the electro-chemical cell, unlike standard chlor-alkali processes. For instance, a typical incoming flue-gas temperature (after electro-static precipitation treatment, for instance) might well be 300° C. Heat exchangers can lower that flue-gas to a point less than 300° C., while warming the anolyte and catholyte fluids (which, for LVE, should generally be retained >87.5° C.) allows some embodiments of the present invention to operate without the power-losses associated with anolyte and catholyte heaters.

Generally, since the flue-gas available at power-plant exits at temperatures between 100° C. (scrubbed typical), 300° C. (after precipitation processing), and 900° C. (precipitation entrance), or other such temperatures, considerable waste-heat processing can be extracted by cooling the incoming flue-gas through heat-exchange with a power-recovery cycle, of which an example is an ammonia-water cycle ("Kalina" cycle, for example), a steam cycle, or any such cycle that accomplishes the same thermodynamic means. Since some embodiments of the present invention rely upon DC power to accomplish the manufacture of the reagent/absorbent for the present invention, the process can be directly powered, partially or wholly, by waste-heat recovery that is accomplished without the normal transformer losses associated with converting that DC power to AC power for other uses. Further, through the use of waste-heat-to-work engines, significant efficiencies can be accomplished without an electricity generation step being employed at all. In some conditions, these waste-heat recovery energy quantities may be found to entirely power embodiments of the present invention.

Waste-heat recovery from other processes of the systems may also be employed similarly to gain efficiencies at other points in the system.

The above specifications and examples provide a complete description of the structure and use of exemplary embodiments. Although certain embodiments have been described above with a certain degree of particularity, or with reference to one or more individual embodiments, those skilled in the art could make numerous alterations to the disclosed embodiments without departing from the scope of this invention. As such, the illustrative embodiments of the present apparatuses, systems, and methods are not intended to be limiting. Rather, the present devices, systems, and methods include all modifications and alternatives falling within the scope of the claims, and embodiments other than those shown may include some or all of the features of the depicted embodiments. For example, components may be combined as a unitary structure and/or connections may be substituted. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not to be interpreted as including means-plus- or step-plus-function limitations, unless such a limitation is explicitly recited in a given claim using the phrase(s) "means for" or "step for," respectively.

The invention claimed is:

1. A method of effectively reducing an amount of carbon dioxide from a gas stream comprising the steps of
    (a) generating an aqueous hydroxide solution in a chloro-alkali cell;
    (b) diluting the aqueous hydroxide solution to obtain a 5% to 15% by weight aqueous hydroxide solution;
    (c) admixing the diluted aqueous hydroxide solution with a first portion of a gas stream containing carbon dioxide to produce carbonate in a first admixture; and
    (d) removing water from the first admixture in a water removal unit;
    (e) after step (d), admixing the first admixture with a second portion of the gas stream to produce bicarbonate in a second admixture.

2. The method of claim 1, wherein 20% to 30% of water is removed from the first admixture in step (d).

3. The method of claim 1, wherein 23% to 26% of water is removed from the first admixture in step (d).

4. The method of claim 1, where the diluted aqueous hydroxide solution has a concentration of 8% to 10%.

5. The method of claim 1, further comprising the steps of separating a liquid phase from a solid phase of the second admixture and adding as a diluent at least a portion of the liquid phase to the aqueous hydroxide solution in step (b).

6. The method of claim 1, where the second admixture comprises a liquid phase and a solid phase and the method further comprises the steps of separating the liquid phase from the solid phase and returning at least a portion of the liquid phase to the second admixture where the first admixture is admixed.

7. The method of claim 1, where the second admixture comprises a liquid phase and a solid phase and the method further comprises the steps of separating the liquid phase from the solid phase and adding at least a portion of the liquid phase to the water removal unit.

8. The method of claim 1, wherein generating the aqueous hydroxide comprises:
    obtaining a group-1 or group-2 salt;
    admixing the salt with acid and water, acid and steam, or acid, water, and steam to produce a protonated salt solution; and electrolyzing the protonated salt solution to produce the hydroxide, a hydrogen gas, and a chlorine gas.

9. The method of claim 8, further comprising removing water from the hydrogen gas and transferring the water removed from the hydrogen gas to a condensate storage tank.

10. The method of claim 8, further comprising removing water from the first portion and the second portion of the gas stream after exiting the first admixture and second admixture, respectively, and transferring the water removed from the gas stream to a condensate storage tank.

11. The method of claim 1, where the second admixture comprises a liquid phase and a solid phase and the method further comprises the steps of separating the liquid phase from the solid phase; drying the solid phase in a dryer; removing the water from an exhaust of the dryer; and transferring the water removed from the exhaust to a condensate storage tank.

12. The method of claim 1, wherein the gas stream is a natural gas stream or a flue-gas stream.

13. The method of claim 1, wherein the hydroxide is in the form of sodium hydroxide.

* * * * *